(12) United States Patent
Coates

(10) Patent No.: US 9,257,925 B2
(45) Date of Patent: Feb. 9, 2016

(54) SPEED CONTROL FOR POWER TOOLS

(75) Inventor: Neil Coates, Stockton-on-Tees (GB)

(73) Assignee: HUSQVARNA AB, Huskvarna (SE)

( * ) Notice: Subject to any disclaimer, the term of this patent is extended or adjusted under 35 U.S.C. 154(b) by 120 days.

(21) Appl. No.: 14/125,225

(22) PCT Filed: Jun. 20, 2011

(86) PCT No.: PCT/GB2011/051149
§ 371 (c)(1),
(2), (4) Date: Dec. 10, 2013

(87) PCT Pub. No.: WO2012/175901
PCT Pub. Date: Dec. 27, 2012

(65) Prior Publication Data
US 2014/0117892 A1   May 1, 2014

(51) Int. Cl.
*B60K 6/36* (2007.10)
*H02P 7/06* (2006.01)
*A01D 69/02* (2006.01)
*B25F 5/00* (2006.01)

(52) U.S. Cl.
CPC *H02P 7/06* (2013.01); *A01D 69/02* (2013.01); *B25F 5/00* (2013.01)

(58) Field of Classification Search
CPC ........ B25F 5/00; H02H 7/0838; B25B 2/008; H02P 7/06
See application file for complete search history.

(56) References Cited

U.S. PATENT DOCUMENTS

2008/0089673 A1   4/2008   Lucas et al.
2009/0295313 A1*  12/2009  Suzuki et al. ............... 318/139

FOREIGN PATENT DOCUMENTS

| EP | 2030710 A2 | 3/2009 |
|---|---|---|
| EP | 2128734 A1 | 12/2009 |
| EP | 2281650 A1 | 2/2011 |

OTHER PUBLICATIONS

International Search Report and Written Opinion of PCT/GB2011/051149 mailed Apr. 2, 2012.
Chapter I International Preliminary Report on Patentability of PCT/GB2011/051149 mailed Dec. 23, 2013.

* cited by examiner

*Primary Examiner* — Karen Masih
(74) *Attorney, Agent, or Firm* — Nelson Mullins Riley & Scarborough LLP

(57) ABSTRACT

A power tool, typically battery-operated, such as a lawnmower, comprising: a driven element (9), an electric motor (7) coupled to the driven element so as to drive the driven element, an electric power source (2) electrically coupled to the motor (7) so as to supply electric current to the motor (7) and a control circuit (3) arranged to control the supply of electric current to the motor (7) from the power source (2), and a current sensor (6) operable to output a current signal indicative of the current flowing through the motor (7); in which the control circuit (3) has a high speed mode (40) and a low speed mode (32), the control circuit (3) being arranged so that: when it is in the high speed mode (40), the control circuit supplies electric current to the motor (7) so as to attempt to drive the driven element (9) at a first desired speed (54); when it is in the low speed mode (32), the control circuit supplies electric current to the motor (7) so as to attempt to drive the driven element (9) at a second desired speed (52) which is lower than the first desired speed (54); and the control circuit (3) switches between the high speed mode (40) and the low speed mode (32) dependent on the current signal. As such, energy can be saved by efficient use of electrical power, by increasing the speed of the driven element when the load increases.

13 Claims, 3 Drawing Sheets

SPEED CONTROL FOR POWER TOOLS

This invention relates to power tools, such as, non-exclusively, battery-powered lawnmowers.

Battery operated power tools are now well known in the prior art, and typically comprise an electric battery as a power source, an electric motor controlled by a control circuit of some kind, and a driven element such as a blade or a rotary bit, driven by the motor. They allow the tools to be much more portable than if they were tied to mains electricity by means of a power cord.

However, with such tools it is important to save energy, to make efficient use of the energy stored within the battery to avoid the need to charge or replace the battery becoming unnecessarily frequent. Of course, energy conservation is advantageous as a general rule.

Battery powered lawnmowers have been proposed. A traditional rear-collect lawnmower will typically have a blade of diameter 30 to 50 centimeters. Energy is absorbed by the grass as it is cut; running the blade at an unnecessarily high speed will result in unnecessarily high energy losses, particularly losses to windage (that is, energy carried in the movement of air).

According to a first aspect of the invention, there is provided a power tool, comprising: a driven element, an electric motor coupled to the driven element so as to drive the driven element, an electric power source electrically coupled to the motor so as to supply electric current to the motor and a control circuit arranged to control the supply of electric current to the motor from the power source, and a current sensor operable to output a current signal indicative of the current flowing through the motor;

in which the control circuit has a high speed mode and a low speed mode, the control circuit being arranged so that:

when it is in the high speed mode, the control circuit supplies electric current to the motor so as to attempt to drive the driven element at a first desired speed;

when it is in the low speed mode, the control circuit supplies electric current to the motor so as to attempt to drive the driven element at a second desired speed which is lower than the first desired speed; and the control circuit switches between the high speed mode and the low speed mode dependent on the current signal.

As such, this allows the tool to use a low speed mode when that is all that required; when the current flowing through the motor indicates that strenuous activity is occurring (as the load on the motor increases), then the speed of the motor will be increased. Because the motor is only run at the higher speed when deemed necessary, more efficient use of power is made. Furthermore, the tool will generally run quieter, as the generally noisier high speed mode will only be used when it is necessary. The switch between modes can be automatic and transparent to the user.

Preferably, the tool will be a battery-operated power tool, where the power source comprises a battery. In such a case, the need to conserver electricity is even more important. However, this invention could be applied to tools where the power source is an input for electric current from an external source (such as mains alternating current electricity) in order to make more efficient use of the electric power provided.

Typically, the control circuit will be arranged so as to switch to the high speed mode when the current signal indicates increasing current (generally indicating higher load), and to switch to the low speed mode when the current signal indicates lessening current (thus indicating lower load).

The control circuit may be arranged so as to switch from the low speed mode to the high speed mode when the current signal indicates a current exceeding a first threshold, and possibly also to switch from the high speed mode to the low speed mode when the current signal indicates a current below a second threshold; typically, the first and second thresholds will be different (although they need not be). The first threshold may be higher than the second threshold, so as to avoid the control circuit oscillating quickly between the two modes.

The control circuit may be arranged so that, when it switches from the high speed mode to the low speed mode or from the low speed mode to the high speed mode, it will not switch back into the other mode for a predetermined period of time, typically at least 1, 2, 3 or 4 seconds; the predetermined period may be different for switching between one pair of modes and the other. The delay prevents, or at least reduces, unnecessarily frequency cycling between modes. Additionally or alternatively, the control circuit may be arranged so that, when determining whether the current signal indicates a current that has crossed at least one of the first or second thresholds, it does not so determine unless the current has crossed the first or second threshold for a period of time, typically 1, 2, 3, or 4 seconds.

Typically, the tool will be a lawnmower, with the driven element being a grass-cutting blade. In such a case, the first desired speed may be between 2900 to 3300 revolutions per minute (rpm) (typically between 3000 to 3200 rpm) and the second desired speed may be between 2500 to 2900 rpm (typically between 2600 to 2800 rpm).

However, the tool need not be a lawnmower, and may instead be a hedge trimmer, line trimmer, drill or so on.

The control circuit may be arranged to control the motor, when in the high speed mode, over a range of loadings of the driven element, such that the motor runs at a speed such that the driven element is driven at the first desired speed. Similarly, the control circuit may be arranged to control the motor, when in the low speed mode, over a range of loadings of the driven element, such that the motor runs at a speed such that the driven element is driven at the second desired speed. Thus, in each mode, the speed of the driven element will be approximately constant for a range of loadings of the driven element.

According to a second aspect of the invention, there is provided a method of controlling a power tool, the power tool comprising a driven element, an electric motor coupled to the driven element so as to drive the driven element and a control circuit arranged to control the supply of electric current to the motor from the power source;

the method comprising the control circuit driving the electric motor in a high speed mode so as to attempt to drive the driven element at a first desired speed; and in the low speed mode so as to attempt to drive the driven element at a second desired speed which is lower than the first desired speed;

in which the method comprises the control circuit switching between the high speed mode and the low speed mode dependent on the current flowing through the motor.

As such, this allows the tool to use a low speed mode when that is all that required; when the current flowing through the motor indicates that strenuous activity is occurring (as the load on the motor increases), then the speed of the motor will be increased. Because the motor is only run at the higher speed when deemed necessary, more efficient use of power is made. Furthermore, the tool will generally run quieter, as the generally noisier high speed mode will only be used when it is necessary.

Preferably, the tool will be a battery-operated power tool, where the power source comprises a battery. In such a case, the need to conserver electricity is even more important. However, this invention could be applied to tools where the power source is an input for electric current from an external source (such as mains alternating current electricity) in order to make more efficient use of the electric power provided.

Typically, method will comprise switching to the high speed mode when the current increases (generally indicating higher load), and switching to the low speed mode when the current lessens (thus indicating lower load).

The method may comprise switching from the low speed mode to the high speed mode when the current exceeds a first threshold, and possibly switching from the high speed mode to the low speed mode when the current falls below a second threshold; typically, the first and second thresholds will be different (although they need not be).

The first threshold may be higher than the second threshold, so as to avoid the control circuit oscillating quickly between the two modes.

The method may comprise, after switching from the high speed mode to the low speed mode or from the low speed mode to the high speed mode, not switching back into the other mode for a predetermined period of time, at least 1, 2, 3 or 4 seconds; the predetermined period may be different for switching between one pair of modes and the other. This delay prevents, or at least reduces, unnecessarily frequency cycling between modes.

Additionally or alternatively, the method may comprise, when determining whether the current signal indicates a current that has crossed at least one of the first or second thresholds, not so determining unless the current has crossed the first or second threshold for a period of time, typically 1, 2, 3, or 4 seconds.

Typically, the tool will be a lawnmower, with the driven element being a grass-cutting blade. In such a case, the first desired speed may be between 2900 to 3300 revolutions per minute (rpm) (typically between 3000 to 3200 rpm) and the second desired speed may be between 2500 to 2900 rpm (typically between 2600 to 2800 rpm).

However, the tool need not be a lawnmower, and may instead be a hedge trimmer, line trimmer, drill or so on.

The method may comprise controlling the motor to run, when in the high speed mode, over a range of loadings of the driven element, at a speed such that the driven element is driven at the first desired speed. Similarly, method may comprise controlling the motor to run, when in the low speed mode, over a range of loadings of the driven element, at a speed such that the driven element is driven at the second desired speed. Thus, in each mode, the speed of the driven element will be approximately constant for a range of loadings of the driven element.

There now follows, by way of example only, an embodiment of the present invention, described with reference to an as illustrated in the accompanying drawings, in which.

Figure 1:
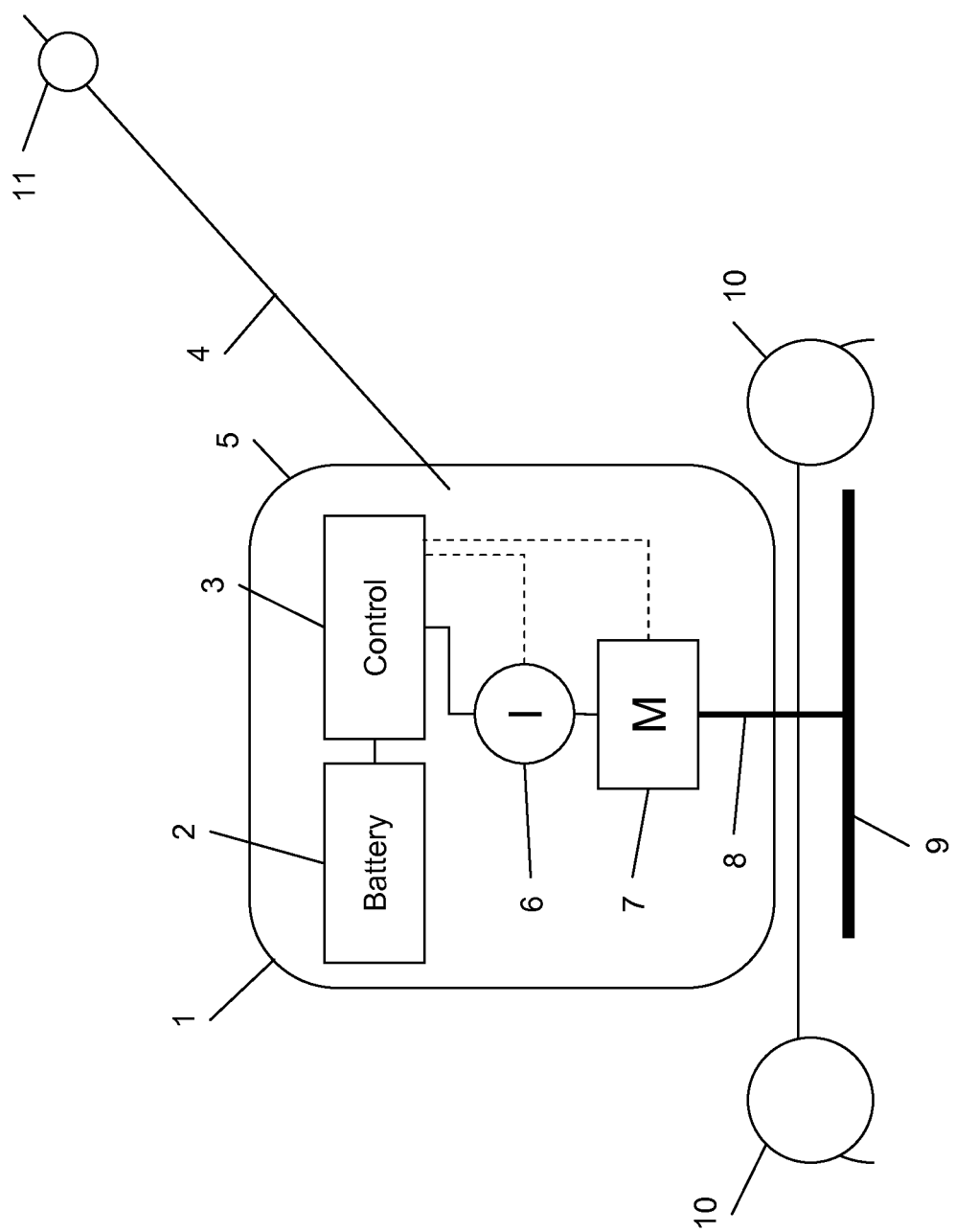
FIG. 1 shows a schematic view of a lawnmower according to an embodiment of the invention.

A lawnmower 1 according to an embodiment of the invention is shown in FIG. 1 of the accompanying drawings. This lawnmower comprises a housing 5, supported on wheels 10 (although the lawnmower could equally well be a hover mower, which is supported on a cushion of air in use). The lawnmower 1 is a battery-powered lawnmower, in that its source of power is an electric battery 2 contained within the housing. The battery is used to power an electric motor 7, which drives a rotary blade 9 by means of drive axle 8 coupled to the motor output shaft, typically by means of a gearbox (not shown).

The supply of electric current from the battery 2 to the motor 7 is controlled by a control circuit 3. This is arranged so as to be able to control the motor so as to rotate at a given rotational speed over a range of loadings; such control techniques are well known in the art. Typically, the control circuit 3 will determine the speed of the motor by means of a sensor that is part of the motor 7 and use this to determine how much current to supply to the motor 7.

The user pushes the lawnmower by means of handle 4. The operation (typically on/off) of the lawnmower 1 is controlled by control switch 11, which is connected to the control circuit 3.

A current sensor 6 is provided between the battery 2 and the motor 7, to monitor the level of current flowing into the motor. The output of the current sensor (shown as a dotted line in FIG. 1) is connected to the control circuit 3.

Figure 2:
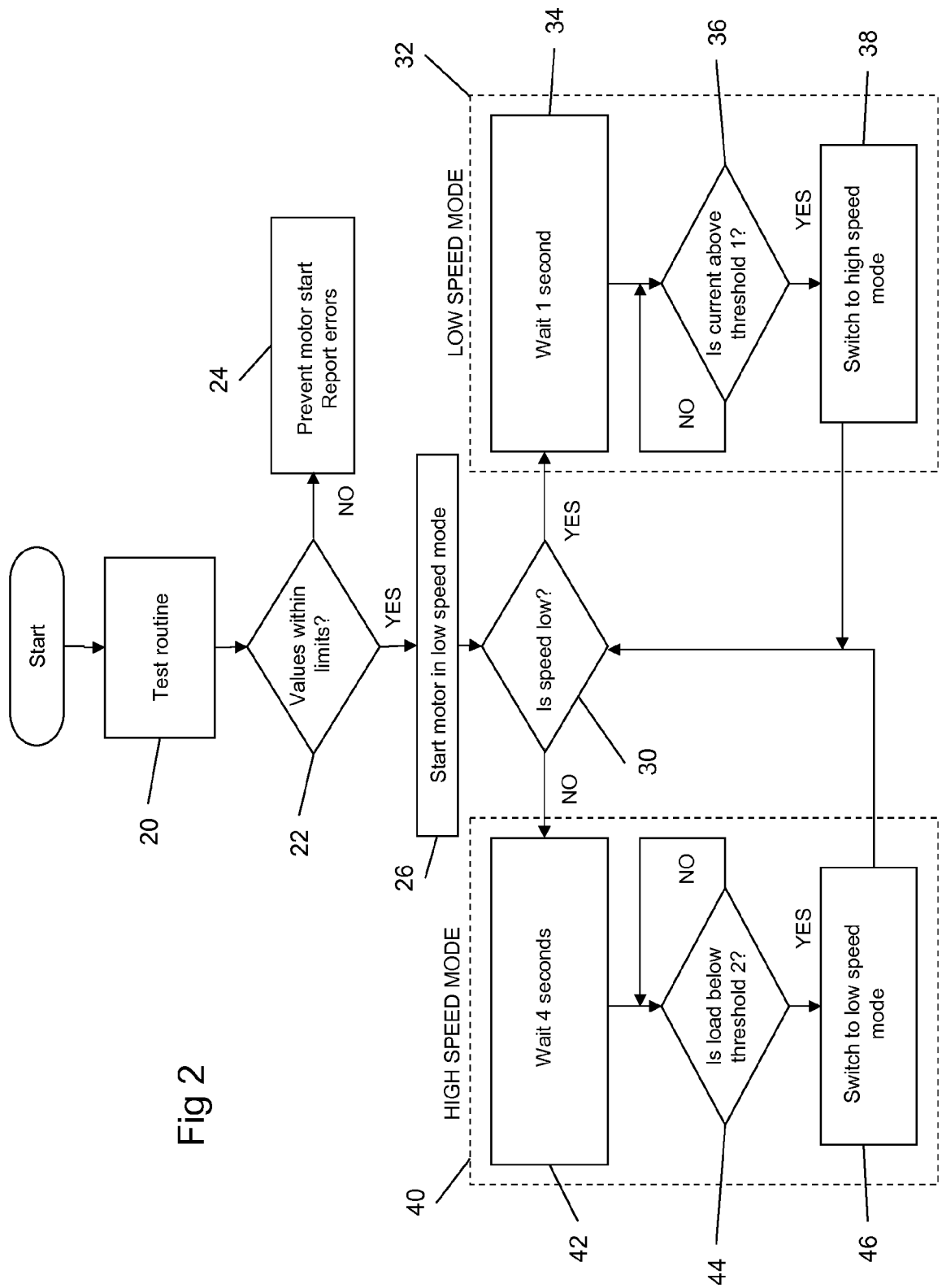
FIG. 2 shows a flowchart showing the operation of the control circuit of the lawnmower of FIG. 1.

In order to control the lawnmower, the control circuit 3 carries out the method shown in FIG. 2 of the accompanying drawings. In this method, whenever the user starts up the lawnmower (by activating control switch 11), the control circuit carries out the following checks at step 20:

Motor temperature check

Controller temperature check

Battery Management Logic output check

Supply Voltage check (that is, that the battery 2 has sufficient charge)

Motor hall sensor (magnetic position sensors that can observe the passage of the magnetic poles in the motor's rotor; used to determine the speed of the rotor) check At step 22, the control circuit checks whether the results of the above checks are within normal limits; if not, the control circuit 3 proceeds to step 24 and terminates, preventing the starting of the motor.

If the results of the tests are successful, the control circuit starts (at step 26) the motor running at a low speed, such that the speed of the blade 9 is kept at approximately 2600 to 2800 revolutions per minute (rpm), depending on the size of the blade (it being desirable for the linear velocity of the tip of the blade to be the same regardless of the size of the blade within the typical range of blade sizes of 30 to 50 centimeter diameter). This speed should normally be sufficient for use in light cutting conditions, such as those experienced by a user cutting the same lawn once or twice a week.

The remainder of the method shown forms a loop, which will run until the user switches off power once again.

The method enters the loop at decision block 30. This decides whether the speed of the motor 7 is low. On entry the speed generally will be, because that is what the control circuit 3 started with at step 26. As such, the method enters the low speed mode 32.

The low speed mode starts by waiting (at step 34) a second before changing any status of the motor 7. As such, the control circuit 3 will stay in the low speed mode 32 for at least a second. The control circuit then, at step 36, continually checks whether the current is above a first threshold at step 36, using the output of the current sensor 6. If not, then the blade 9 is not under such load as to require extra assistance in cutting, and so the control circuit 3 can remain in the low speed mode, and the method returns to step 36 so as to check the current once again.

If the current has increased above the first threshold, then the user will likely be cutting grass that has put significant extra load on the blade. Thus, in order to provide extra assistance to the cutting, the control circuit, at step 38, increase the speed of the motor 7 to a high speed, typically 3000 to 3200 rpm (again, it being desirable for the linear velocity of the tip of the blade to be the same regardless of the size of the blade within the typical range of blade sizes of 30 to 50 centimeter diameter). This speed will still be less than the maximum speed of the motor if the speed were uncontrolled, but still provides significant extra assistance in grass cutting.

Once the motor has been sped up to the high speed, the low speed mode 32 is exited, and the method returns to decision block 30. The speed is now not low, and so the high speed mode 40 is entered.

As with the low speed mode 32, the high speed mode first contains a pause, this time of four seconds (step 42); these pauses 34, 42 prevent unnecessarily frequent switching of modes.

The control circuit then starts to continually monitor (at step 44) the current flowing through the motor 7, using the output of the current sensor 6. If the current stays above a second threshold, which is lower than the first threshold (again to prevent unnecessary cycling between modes) for a predetermined period of time (say four seconds), then the method continues to monitor the current at step 44. If the current does fall below the second threshold, then the load on the blade 9 has lessened, and so the user does not require the boost in assistance any further. As such, the control circuit commences, at step 46, to control the motor 7 so as to run at the low speed once more.

The high speed mode 40 then exits and returns control to the decision block 30. As the speed of the motor is now low, the low speed mode 32 is once more entered, as discussed above.

Figure 3:
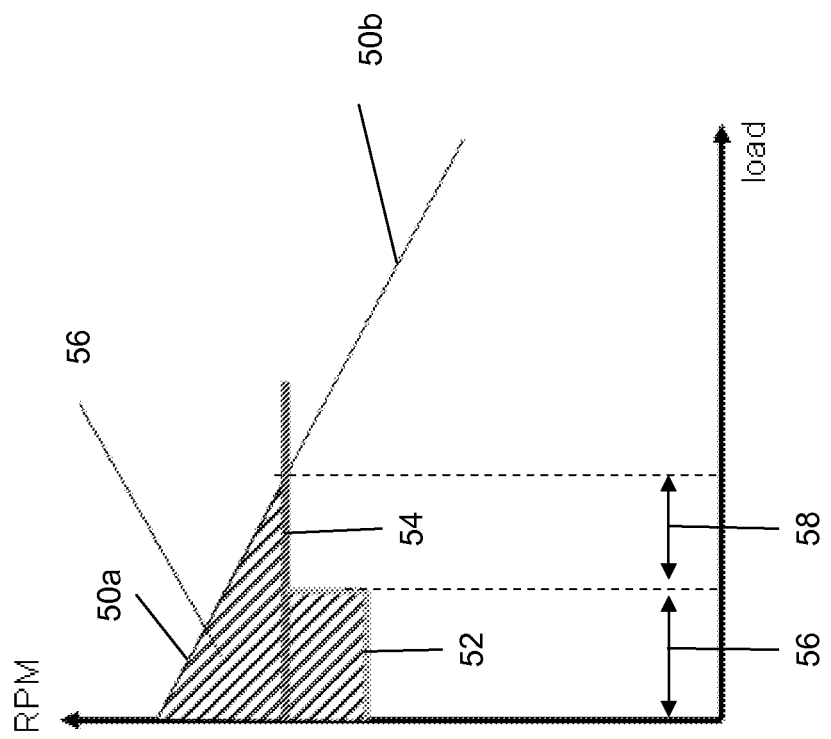
FIG. 3 shows a graph of blade speed against blade load.

The effects of the invention as applied in this embodiment can be seen in FIG. 3 of the accompanying drawings, which show a graph of motor speed against load. Straight line segments 50a and 50b show how the motor is run in a prior art system where the motor is continually run at maximum speed; as load increases, the speed at which the blade 9 is driven decreases.

However, if the method of this embodiment is employed, then when the load is low, in range 56, the motor will be run at the low speed 52. Once the load increases into range 58, the motor will be run at the high speed 54. Both of these speeds are lower than the maximum speed 50a of the motor 7 for the given load. As such, the shaded area 56 between the lines 50a, 52 and 54 represents the area where energy is being saved, without any action by the user.

Above range 58, the method of the present embodiment will run the motor 7 at the same speed as the prior art would achieve (50b); there is therefore no energy saving in this area, but no extra energy expenditure.

The invention claimed is:

1. A power tool, comprising:
    a driven element,
    an electric motor coupled to the driven element so as to drive the driven element,
    an electric power source electrically coupled to the motor so as to supply electric current to the motor and a control circuit arranged to control the supply of electric current to the motor from the power source, and
    a current sensor operable to output a current signal indicative of the current flowing through the motor;
    in which the control circuit has a high speed mode and a low speed mode, the control circuit being arranged so that:

when it is in the high speed mode, the control circuit supplies electric current to the motor so as to attempt to drive the driven element at a first desired speed;
when it is in the low speed mode, the control circuit supplies electric current to the motor so as to attempt to drive the driven element at a second desired speed which is lower than the first desired speed; and
the control circuit switches between the high speed mode and the low speed mode dependent on the current signal, wherein the control circuit is configured to switch to the high speed mode when the current signal indicates increasing current and to switch to the low speed mode when the current signal indicates lessening current.

2. The tool of claim 1, being a battery-operated power tool, where the power source comprises a battery.

3. The tool of claim 1, in which the control circuit is arranged so as to switch from the low speed mode to the high speed mode when the current signal indicates a current exceeding a first threshold, and to switch from the high speed mode to the low speed mode when the current signal indicates a current below a second threshold.

4. The tool of claim 1, in which the control circuit is arranged so that, when it switches from the high speed mode to the low speed mode or from the low speed mode to the high speed mode, it will not switch back into the other mode for a predetermined period of time.

5. The tool of claim 1, being a lawnmower, with the driven element being a grass-cutting blade.

6. The tool of claim 5, in which the first desired speed is between 2900 to 3300 revolutions per minute (rpm) and the second desired speed is between 2500 to 2900 rpm.

7. The tool of claim 1 in which the control circuit is arranged to control the motor, when in the high speed mode, over a range of loadings of the driven element, such that the motor runs at a speed such that the driven element is driven at the first desired speed and, when in the low speed mode, over a range of loadings of the driven element, such that the motor runs at a speed such that the driven element is driven at the second desired speed.

8. A method of controlling a power tool, the power tool comprising a driven element, an electric motor coupled to the driven element so as to drive the driven element and a control circuit arranged to control the supply of electric current to the motor from the power source;
    the method comprising the control circuit driving the electric motor in a high speed mode so as to attempt to drive the driven element at a first desired speed; and in the low speed mode so as to attempt to drive the driven element at a second desired speed which is lower than the first desired speed;
    in which the method comprises the control circuit switching between the high speed mode and the low speed mode dependent on the current flowing through the motor, wherein the control circuit switches to the high speed mode when the current increases and switches to the low speed mode when the current lessens.

9. The method of claim 8, comprising switching from the low speed mode to the high speed mode when the current exceeds a first threshold, and switching from the high speed mode to the low speed mode when the current falls below a second threshold.

10. The method of claim 8, comprising, after switching from the high speed mode to the low speed mode or from the low speed mode to the high speed mode, not switching back into the other mode for a predetermined period of time.

11. The method of claim 8, in which the tool is a lawnmower, with the driven element being a grass-cutting blade.

12. The method of claim 11, in which the first desired speed is between 2900 to 3300 revolutions per minute (rpm) and the second desired speed is between 2500 to 2900 rpm.

13. The method of claim 8, comprising controlling the motor to run, when in the high speed mode, over a range of loadings of the driven element, at a speed such that the driven element is driven at the first desired speed and, when in the low speed mode, over a range of loadings of the driven element, at a speed such that the driven element is driven at the second desired speed.

* * * * *